United States Patent [19]

Bloecher et al.

[11] Patent Number: 4,652,275

[45] Date of Patent: Mar. 24, 1987

[54] ERODABLE AGGLOMERATES AND ABRASIVE PRODUCTS CONTAINING THE SAME

[75] Inventors: Ulrich Bloecher, St. Paul, Minn.; Ernest J. Duwell, Hudson, Wis.

[73] Assignee: Minnesota Mining and Manufacturing Company, St. Paul, Minn.

[21] Appl. No.: 763,240

[22] Filed: Aug. 7, 1985

[51] Int. Cl.$^4$ ............................................. C09K 3/14
[52] U.S. Cl. ........................................ 51/298; 51/307
[58] Field of Search ................................... 51/298, 307

[56] References Cited

U.S. PATENT DOCUMENTS

| Re. 29,808 | 10/1978 | Wagner | 51/298 |
| 4,311,489 | 1/1982 | Kressner | 51/298 |
| 4,314,827 | 2/1982 | Leitheiser et al. | 51/298 |
| 4,364,746 | 12/1982 | Bitzer et al. | 51/298 |
| 4,393,021 | 7/1983 | Eisenberg et al. | 264/143 |

FOREIGN PATENT DOCUMENTS 2417196  3/1976  Fed. Rep. of Germany .

OTHER PUBLICATIONS

The Dictionary of Paper, 3rd edition, American Paper and Pulp Association (New York: 1965), pp. 5–30.

Primary Examiner—Paul Lieberman
Assistant Examiner—Willie J. Thompson
Attorney, Agent, or Firm—Donald M. Sell; James A. Smith; David L. Weinstein

[57] ABSTRACT

Erodable agglomerates containing individual abrasive grains, a binder and matrix material selected from the group consisting of pulp suitable for making paper and derivatives thereof, wood flour, and vermiculate. The agglomerates are useful for coated abrasives and bonded abrasives. Abrasive products containing the agglomerates provide higher stock removal than abrasive products bearing a single layer of abrasive grains, since the erodable character of the agglomerates allows the sloughing off of spent individual abrasive grains during abrading operations and the exposing of new abrasive grains to the workpiece. The invention also provides a method of preparing the agglomerates of this invention.

19 Claims, 3 Drawing Figures

ERODABLE AGGLOMERATES AND ABRASIVE PRODUCTS CONTAINING THE SAME

BACKGROUND OF THE INVENTION

This invention relates to erodable agglomerates containing abrasive grains, and, more particularly to abrasive products containing the erodable agglomerates.

Conventional coated abrasives typically consist of a single layer of abrasive grain adhered to a backing. It has been found that only up to about 15% of the grains in the layer are actually utilized in removing any of the workpiece. It follows then that about 85% of the grains in the layer are wasted. Furthermore, the backing, one of the more expensive components of the coated abrasive, must also be disposed of before the end of its useful life.

To overcome this problem of waste, many attempts have been made to distribute the abrasive grains on the backing in such a manner so that a higher percentage of abrasive grains can be utilized, thus leading to extended life of the coated abrasive product. The extended life further leads to fewer belt or disc changes by the operators, thereby saving time and reducing labor costs. It is apparent that merely depositing a thick layer of abrasive grains on the backing will not solve the problem, because the grains lying below the topmost grains are not likely to be used.

The prior art describes several attempts to distribute abrasive grains in a coated abrasive in such a way as to prolong the life of the product. U.S. Pat. No. Re. 29,808 describes a grinding material comprising a multiplicity of hollow bodies whose walls contain abrasive grains and a bonding means for bonding the abrasive grains to each other at the wall surface, whereby during grinding a multiplicity of fresh abrasive grains become continuously available at the grinding surface wherein the grinding action of the grinding surface depends exclusively on the size of the abrasive grains.

U.S. Pat. No. 4,311,489 describes a coated abrasive product having abrasive particles secured to a backing by maker and size coats where each abrasive particle consists of an essentially solid agglomerate of fine abrasive grains and an inorganic, brittle cryolite matrix. The agglomerates have an irregular surface which permits a strong bond to the maker and size coats which permits gradual wearing down of the agglomerates during grinding by gradual removal of dulled abrasive grains from the agglomerates.

German Auslegeschrift No. 2,417,196 describes a coated abrasive article comprising an abrasive body on a substrate. The abrasive body comprises a hollow body, the walls of which are formed of binder and abrasive grain. The hollow bodies are ruptured during the grinding process, thus allowing the wall of the hollow body to act on the material being abraded. Accordingly, grain wear is distributed over the entire surface area of the substrate. Although the products described in those patents are useful, even greater utilization of abrasive grains in coated abrasives are desired by industry.

SUMMARY OF THE INVENTION

In one aspect, this invention involves erodable agglomerates comprising individual grains of abrasive mineral, resinous binder, and erodable matrix material which facilitates breakdown of the agglomerates during their utilization in an abrasive product. The matrix material is selected from pulp suitable for making paper, wood flour, and vermiculite. The matrix material renders the agglomerates sufficiently durable to avoid premature destruction under severe abrading conditions, yet sufficiently soft to break down under these abrading conditions.

The agglomerates of the present invention provide high stock removal because the agglomerates provide extended life for the abrasive products in which they are utilized, since the spent individual abrasive grains are sloughed off during abrading operations and new abrasive grains are then exposed to the workpiece. Coated abrasive containing the agglomerates of this invention have been found to be useful for both finishing operations and stock removal operations. The key advantages of coated abrasives made with the agglomerates of this invention are long useful life and efficient use of abrasive grains.

In another aspect, this invention involves a method of making the aforementioned agglomerates and abrasive products containing same, e.g. coated abrasives and abrasive wheels. The matrix material prevents settling of the individual grains and assures retention of bulk and shape of the agglomerates during the curing step employed in making them.

DETAILED DESCRIPTION

Figure 1:
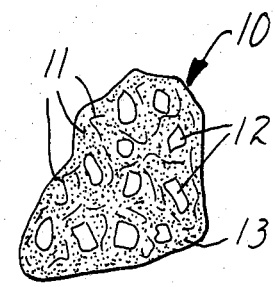
FIG. 1 is a schematic representation of an agglomerate of this invention having a relatively high percentage of binder.
Figure 2:
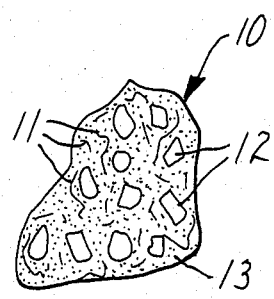
FIG. 2 is a schematic representation of an agglomerate of this invention having a relatively medium percentage of binder.
Figure 3:
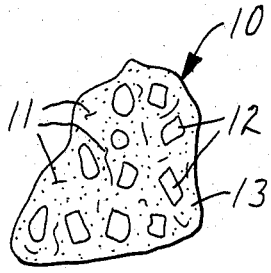
FIG. 3 is a schematic representation of an agglomerate of this invention having a relatively low percentage of binder.

The agglomerate itself 10 is erodable, porous, and the essential ingredients thereof, i.e. the matrix material 11, individual abrasive grains 12, and resinous binder 13 are randomly distributed. In order that the agglomerate be erodable, both the matrix material and the binder must be erodable. The volume per unit weight of the agglomerate is higher than the volume per unit weight that would be expected from a non-porous agglomerate containing the same ingredients. This characteristic results from the fact that the matrix material gives a structure that provides a multiplicity of voids in the agglomerate.

The key function of the matrix material is to facilitate break-down of the agglomerates during use to reveal additional individual abrasive grains as the spent grains reach the end of their useful life.

The matrix material is preferably liquid-absorbent, more preferably highly water absorbent, in order to absorb the solvent accompanying the binder during the preferred process of forming the agglomerates. The matrix material is preferably non-thermoplastic, in order that it not soften or flow during use in grinding operations, when heat is generated by friction. It is desirable that the matrix material degrade without softening, flowing, or melting. Finally, it is highly desirable that the matrix material not undergo deleterious reaction with the resin or resins comprising the binder, in order that the binder not be weakened and the matrix material not be excessively softened or hardened. The physical structure of the matrix material is preferably of such a nature that when combined in the agglomerate with the binder, the matrix material/binder composite is sufficiently porous in order to allow removal of excess liquid from the mass of agglomerated material during the preferred process of preparation of the agglomerate and to facilitate breakdown of the agglomerate during abrading operations. Voids present in the agglomerate also allow both removal of ground debris and increased pressure of individual grains against the workpiece to assure breakdown of the agglomerates. The matrix material should also be sufficiently strong in order to prevent collapse of the agglomerate during the curing and dehydration steps in the preferred process in the preparation thereof.

The matrix material can be prepared from fibrous and non-fibrous materials. Matrix materials that have been found to be particularly suitable for use in this invention include pulp suitable for use in making paper and derivatives thereof, wood flour, and vermiculite.

Pulp suitable for use in making paper, as used herein, means a cellulosic material prepared by chemical or mechanical means, chiefly from wood, but also from rags and other materials, and used in making paper and other cellulose products. The preferred pulps are mechanical wood pulps, such as, for example, groundwood pulp, defibrated pulp, and exploded pulp, chemical wood pulps, such as, for example, sulfite pulp, neutral sulfite pulp, kraft (sulfate) pulp, chemical cellulose pulp, soda pulp, semichemical pulp, and chemigroundwood pulp. Most preferred are pulps derived from hardwood, e.g. kraft pulp. Other pulps that are suitable for use in this invention include cotton fiber or rag pulps, paper stock from reclaimed waste paper, and pulps from other fibers, e.g. bamboo, reeds, manila, jute. A comprehensive list of pulps that are suitable for use in paper making and in this invention can be found in The Dictionary of Paper, 3rd edition, American Paper and Pulp Association (New York: 1965), pp. 5-30.

Wood flour, as used herein, means finely ground pine wood, sawdust, or wood waste. Vermiculite, as used herein, includes expanded vermiculite and nonexpanded vermiculite.

Individual abrasives grains suitable for the present invention are well-known in the art and include, but are not limited to, aluminum oxide ($Al_2O_3$), zirconium oxide, garnet, emery, corundum, alumina:zirconia, carbides, such as silicon carbide, boron carbide, nitrides, such as cubic boron nitride, diamond, ruby, flint, modified ceramic aluminum oxide, and the like.

The disposition of the individual abrasive grains in the agglomerate may be "closed", i.e., with the individual grains making contact with one another, or "open", i.e., with spaces between the individual grains.

The functions of the binder are to bond the individual abrasive grains to the matrix material and to define the hardness and breakdown character of the agglomerate.

Binders suitable for this invention are well-known in the art and include, but are not limited to, phenolic resins, urea-formaldehyde resins, phenol formaldehyde resins, epoxy resins, and alkyd resins. While synthetic organic binders are preferred, natural organic binders, e.g. hide glue, and inorganic binders can also be used.

Grinding aids can also be incorporated in the agglomerate. Representative examples of grinding aids suitable for the agglomerate of this invention include inorganic halides, e.g. cryolite ($Na_3AlF_6$), potassium borofluoride ($KBF_4$), inorganic sulfides, chlorinated hydrocarbons.

Conventional fillers can also be incorporated in the agglomerates. A representative example of such a filler is calcium carbonate.

The amount of each of the essential ingredients in the agglomerate can vary, but preferably ranges from about 0.3 to about 8 percent by weight matrix material, from about 95 to about 85 percent by weight abrasive mineral, and from about 5 to about 30 percent by weight binder. As the concentration of binder decreases, ease of breakdown of the agglomerate is increased.

The agglomerates preferably range from 150 micrometers to 3000 micrometers in largest dimension. If the individual abrasive grains are very fine, for example corresponding to P 180 (FEPA-Norm), then between 10 and 1000 individual grains will be contained in each agglomerate. If the individual abrasive grains correspond to P 36, then between 2 and 20 grains will be contained in each agglomerate.

The agglomerates are typically irregular in shape, but they can be formed into spheres, spheroids, ellipsoids, pellets, rods, or other conventional shapes.

Individual abrasive grains can be used along with the agglomerates of this invention, and the proportion of individual abrasive grains employed in this manner may be as high as 70% of the weight of the agglomerates.

The erodability characteristics of the agglomerate, i.e. rate of breakdown or erosion under a given load, can be varied by varying the resinous binder and abrasive mineral with respect to identity of each, relative amount of each, or both. For example, agglomerates having harder binders erode more slowly than agglomerates having softer binders; an agglomerate having a relatively high percentage of binder erodes more slowly than an agglomerate having a relatively low percentage of binder.

The agglomerates of the present invention can be prepared by the following procedure. Matrix material is dispersed in a liquid, preferably an aqueous, medium. The concentration of matrix material in the dispersion preferably ranges from about 5 to about 10 percent by weight. Sufficient liquid must be present to allow the abrasive grains to be distributed uniformly in the mass of matrix material and to provide sufficient porosity in the dry agglomerate. Too great of a deficiency of liquid will result in difficulty in mixing the ingredients which will be used to form the agglomerate. However, too great of an excess of liquid will result in difficulties in drying the mixture which will be formed into the agglomerate. Although thickening agents may be used, they can lead to cure and blister problems in subsequent processing.

The dispersion of liquid and matrix material is then mixed with abrasive mineral and binder. Devices that are suitable for the mixing step include conventional blade mixers. The concentration of abrasive mineral in the wet mix preferably ranges from about 55 to about 94 percent by weight. The concentration of the binder preferably ranges from about 5 to about 35 percent by weight. The concentration of the combination of liquid and matrix material dispersion preferably ranges from about 1 to about 40 percent by weight.

The preferred composition for preparing the agglomerates comprises 100 parts by weight matrix material, 900 parts by weight water, 1100 parts by weight resinous binder, and 6600 to 10,000 parts by weight abrasive mineral.

The mixture is then cured to form an agglomerate comprising individual grains of abrasive mineral, matrix material, and binder. The cured mixture is then treated to provide agglomerates in the desired grade range. Devices suitable for this step include conventional jaw crushers and roll crushers.

The crushing and grading procedures necessary to obtain agglomerates as described frequently results in the agglomerates being of an undesirable size range, and they can either be recycled, e.g., by being added to a new dispersion, or discarded. In utilizing the agglomerates to prepare coated abrasive products, knife coating through a screen can be employed to discard excessively large agglomerates. Compositions made with wood flour are easier to handle than compositions made with pulp in this type of process because the fibrous nature of pulp tends to resist movement under a knife or through screen openings.

Agglomerates of a uniform size can be made in a pelletizer. A mixture of dry wood flour or dry pulp and abrasive mineral can be pelletized by spraying or dropping resin into a mill containing the mineral/matrix mixture.

The agglomerates of this invention can be used to make coated abrasive products, bonded abrasive products, e.g., grinding wheels, nonwoven abrasive products, and other products where abrasive grains are typically employed.

In the case of coated abrasive products, agglomerates can be applied to a backing to form the coated abrasive. The backing may be any suitable material which is compatible with the components of the agglomerates and maintains its integrity under curing and abrading conditions. It is also preferable that the backing be in the form of a conformable, flexible sheet. Backings suitable for the present invention are well-known in the art and include fiber, polymer, paper, woven and nonwoven fabric, foils. The coated abrasive can be prepared in the conventional manner, e.g. applying a make coat over the backing, drop coating the agglomerates over the make coat, applying a size coat, and then curing the thus-applied coatings. The make coats and size coats can be made from conventional materials, e.g. phenolic resins, urea-formaldehyde resins, hide glue, and varnish. Examples of make coats and size coats suitable for the coated abrasives of this invention are described in Leitheiser, U.S. Pat. No. 4,314,827, incorporated herein by reference. Care should be taken so that the size coat does not adversely affect erodability of the agglomerates, i.e., the size coat must be very thin so as not to flood the surface of the coated abrasive. It is also contemplated that radiation-curable resins can also be used for the make coat, size coat, or both. Examples of radiation-curable resins are described in assignee's copending application, Ser. No. 763,331, filed on even date herewith, incorporated herein by reference for the radiation-curable resins described therein.

Grinding wheels can be prepared in the manner described in Example 47 of U.S. Pat. No. 4,314,827, previously incorporated herein by reference.

The abrasive articles containing the agglomerates of the present invention provide the advantage of longer life resulting from either more efficient use of abrasive grains or higher grain loading or both. The coated abrasive product can continue to cut long after a single layer of abrasive grains would have been rendered useless. Agglomerates can also permit a higher total amount of grain to be applied to a given area of a coated abrasive product for a given size of individual abrasive grains.

The following, non-limiting examples will further illustrate the invention.

EXAMPLE 1

This example and the example immediately following demonstrate a method for making agglomerates having a matrix made from pulp suitable for making paper.

Hardwood kraft pulp (25 g) was dispersed in water (700 g). A portion of the water (350 g) was removed by drainage. The resulting dispersion, which had a water/pulp ratio of 14/1, was mixed with $Al_2O_3$ (120 AO grade) (850 g) and phenol-formaldehyde resin (400 g). The resulting mixture was applied to a polyester film at a wet thickness of $\frac{1}{4}$ inch and cured at 91° C. for 14 hours thereon. The cured composition was then crushed in a jaw crusher to yield agglomerates in grade range 20 to 100. Bulk density of grade $-20+40$ was 0.776.

EXAMPLE 2

Hardwood kraft pulp (25 g) was dispersed in water (700 g). A portion of the water (350 g) was removed by drainage. The resulting dispersion, which had a water/pulp ratio of 14/1, was mixed with $Al_2O_3$ (180 AO grade) (480 g) and phenol-formaldehyde resin (200 g). The resulting mixture was applied to a polyester film at a wet thickness of $\frac{1}{4}$ inch and cured at 91° C. for 14 hours thereon. The cured composition was then crushed in a jaw crusher to yield mineral agglomerates in grade range 20 to 100.

EXAMPLE 3

This example demonstrates grinding performance characteristics of the agglomerates prepared in Example 1 and Example 2.

The agglomerates from Example 1 and the agglomerates from Example 2 were coated on backings and compared with standard products under the following conditions. A make coat was applied to 7 inch C disc. The agglomerates were then drop coated onto the make coat. A size coat was then applied over the agglomerates and make coat. The make coat comprised the same resinous binder as was used to make the agglomerate (48 weight percent) and calcium carbonate filler (52 weight percent). The size coat comprised the same resinous binder as was used to make the agglomerate (48 weight percent) and cryolite filler (52 weight percent). The make and size coats were then cured at 88° C. for 12 hours. The weight of agglomerate, make coat, mineral, and size coat are shown in TABLE I. (The weight unit for these components is grains per 4 in. ×6 in.)

TABLE I

| | Grade 120 | | Grade 180 | |
|---|---|---|---|---|
| | Agglomerate from Example 1 | Control** | Agglomerate from Example 2 | Control** |
| Weight of make coat | 39 | 39 | 39 | 31 |
| Weight of agglomerate* | 68 | — | 97 | — |
| Weight of mineral | 49 | 62 | 72 | 42 |
| Weight of size coat | 73 | 32 | 130 | 26 |

*Agglomerate size was −24, +40 in grade 120; −13, +36 in grade 180.
**3M ® Type 3 closed coated aluminum oxide fiber-backed disc.

The discs bearing agglomerates containing 120 grade abrasive grain were run at loads of 5, 10, and 15 lbs. on a slide action disc tester. The disc bearing agglomerates containing 180 grade abrasive grain was run at only 15 lb. load. The results are shown in TABLE II.

TABLE II

| | Total Cuts (grams) | | | | | |
|---|---|---|---|---|---|---|
| | Grade 120 | | | Grade 180 | | |
| Load | Control* | Agglomerate | Improvement (%) | Control* | Agglomerate | Improvement (%) |
| 5 | 48 | 222 | 463 | 31 | 371 | 1196 |
| 10 | 80 | 223 | 278 | | | |
| 15 | 90 | 320 | 356 | | | |

*3M ® Type 3 closed coat aluminum oxide fiber-backed disc.

The coated abrasives formed from the agglomerates of the present invention worked well over the entire load range. At low load, breakdown occurred and the agglomerate remained functional. At high load, gradual breakdown, rather than catastrophic breakdown, occurred. Discs bearing the agglomerates ground far longer than discs bearing non-agglomerated abrasive mineral.

A comparison of total cut values indicated that mineral efficiency was greatly increased by using agglomerates. From Table I it can be seen that although mineral weights were actually lower (21%) for the agglomerate discs containing 120 grade abrasive mineral than for discs employing non-agglomerated abrasive mineral, and although mineral weights were only 71% higher for the agglomerate discs containing 180 grade abrasive mineral than for discs employing non-agglomerated abrasive mineral, total cut for the agglomerates showed no less than 278% improvement at 4.54 kg load and as much as 1196% improvement at 2.27 kg load.

EXAMPLE 4

This example demonstrates the use of wood flour as matrix material.

A dispersion comprising water (30 g) and dry wood flour (30 g) was mixed with $Al_2O_3$ (P180 grade) (2400 g) and phenolic resin (1000 g). The resulting mixture was applied to a polyester film at a wet thickness of ¼ inch and cured at 91° C. for 14 hours. The cured product had a bulk density of 0.812.

The wood flour-containing agglomerates were used to prepare a coated abrasive according to the procedure used in Example 3 to prepare agglomerates containing grade 180 abrasive grains. When the thus-prepared coated abrasive was tested in accordance with the procedure of Example 3, the total cut was 215 grams (2.27 kg load). This value represents a 448% improvement over 3M ® Type 3 closed coat aluminum oxide fiber-backed disc.

EXAMPLE 5

This example demonstrates the use of vermiculite as matrix material.

Expanded vermiculite (50 g) in 50 cc of a 50:50 mixture of 2-ethoxy ethanol (Cellosolve ®):water was mixed with $Al_2O_3$ (P180 grade) (2400 g) and phenolic resin (1000 g). The resulting mixture was applied to a polyester film at a wet thickness of ¼ inch and cured at 91° C. for 14 hours. The cured product had a bulk density of 0.71.

The vermiculite-containing agglomerates were used to prepare a coated abrasive according to the procedure used in Example 3 to prepare agglomerates containing grade 180 abrasive grains. When the thus-prepared coated abrasive was tested in accordance with the procedure of Example 3 the total cut was 195 grams (2.27 kg load). This value represents a 406% improvement over 3M ® Type 3 closed coat aluminum oxide fiber-backed disc.

EXAMPLE 6

This example demonstrates the effect of agglomerate size on grinding performance. Agglomerates were prepared according to the procedure in Example 1. However, the cured mass was crushed and graded to yield agglomerates of grades ranging from $-10+12$ to $-36+60$. These agglomerates were used to prepare coated abrasives according to the procedure used in Example 3 to prepare agglomerates containing grade 120 abrasive grains. Grinding performance was measured according to the procedure used to prepare TABLE II in Example 3. The results are shown in TABLE III.

TABLE III

| Agglomerate size | Accumulated cut (grams) | Percentage of control |
|---|---|---|
| Control* | 75 | 100 |
| $-10 + 12$ | 270 | 360 |
| $-12 + 24$ | 290 | 386 |
| $-24 + 36$ | 185 | 246 |
| $-36 + 60$ | 115 | 153 |

*3M ® Type 3 closed coat aluminum oxide fiber-backed disc.

Regardless of agglomerate size, the coated abrasive of the present invention outperformed the control.

EXAMPLE 7

This example compares coated abrasives of this invention with coated abrasives containing agglomerates of the prior art.

The conditions were as follows:
Apparatus: Robot grinder (reciprocating motion; 60 strokes/min)
Load: 2.68 kg per cm of belt width used
Workpiece: 1018 MS cold rolled steel (1 in. ×7 in.)
Speed: 1950 surface m/min
Cycles: 1 minute grinding cycle with workpiece cooled between cycles The results are shown in TABLE IV.

TABLE IV

| Coated abrasive | Grade | Cut/path | Average cut rate (g/min) | Percentage of control based on cut/path |
|---|---|---|---|---|
| Control[2] | P180 | 0.026 | 18.4 | 100 |
| Hermesit ® Bubbles[3] | P180 | 0.027 | 14.1 | 106 |
| VSM ® Agglomerates[4] | P180 | 0.035 | 19.2 | 134 |
| Agglomerate from Example 2 | P180 | 0.052 | 14.5 | 200 |

[1]Cut/path is a measure of cubic inches of workpiece removed per square inch of coated abrasive used.
[2]3Mite ® RB Cloth
[3]Hermesit ® Bubbles are described in U.S. Pat. Re. 29,808
[4]VSM ® Agglomerates are described in U.S. Pat. No. 4,393,021

It is apparent that the coated abrasive of the present invention is more effective than coated abrasives that contain agglomerates of the prior art since although its average cut rate is not substantially greater than that of the prior art abrasives, its total cut (cut/path) is far greater than that of the prior art abrasives.

EXAMPLE 8

Abrasive grinding wheels were prepared by conventional cold molding techniques using the agglomerates made according to the procedure described in Examples 1 and 2. The abrasive mineral in the agglomerates was grade 150 $Al_2O_3$ (AY). The agglomerate size was $-24+60$.

The grinding wheels were 7.5 cm in diameter, 1.2 cm thick and had a central opening of 1.2 cm. They were prepared by first wetting 376 grams of grade 150 (430 micron average diameter) agglomerate in a conventional dough mixer with 50 grams liquid phenolic resin (50 parts 76% phenolic-formaldehyde resin: 24% $CaCO_3$ filler and 50 parts 20% Cellosolve ®: 80% water), placing the wetted agglomerate in a cement mixer with 94 grams dry phenolic resin and thoroughly mixing. A 95 gram portion of the resultant mixture was evenly distributed in a conventional grinding wheel mold and compacted to the appropriate size by pressing with a hydraulic press for 15-20 seconds. The pressed compact was removed from the mold, and heated at 149° C. for 2 hours. The grinding wheels were then finished and balanced in a conventional manner. The grinding wheel was rotated at about 19,000 rpm without causing decomposition of the wheel. The standard for acceptable wheels is 10,000 rpm.

Various modifications and alterations of this invention will become apparent to those skilled in the art without departing from the the scope and spirit of this invention, and it should be understood that this invention is not to be unduly limited to the illustrative embodiments set forth herein.

I claim:

1. An abrasive article comprising erodable agglomerates, comprising a multiplicity of individual grains of abrasive mineral, matrix material selected from pulp suitable for use in making paper and derivatives thereof, wood flour, vermiculite, and mixtures thereof, and a binder.

2. The article of claim 1 wherein the agglomerate contains from about 60 to about 95 weight percent individual abrasive grains, from about 0.3 to about 8 weight percent matrix material, and from about 5 to about 30 weight percent binder.

3. The article of claim 1 wherein the binder is selected from the group consisting of phenolic resins, urea-formaldehyde resins, phenol formaldehyde resins, epoxy resins, and alkyd resins.

4. Erodable agglomerate suitable for an abrasive product comprising a multiplicity of individual grains of abrasive mineral, matrix material selected from the group consisting of pulp suitable for use in making paper and derivatives thereof, wood flour, vermiculite, and mixtures thereof, and a binder.

5. The agglomerate of claim 4 wherein the agglomerate contains from about 60 to about 95 weight percent individual abrasive grains, from about 0.3 to about 8 weight percent erodable matrix material, and from about 5 to about 30 weight percent binder.

6. The agglomerate of claim 4 wherein the binder is selected from the group consisting of phenolic resins, urea-formaldehyde resins, phenol formaldehyde resins, epoxy resins, and alkyd resins.

7. A coated abrasive article comprising the agglomerates of claim 4 secured to a backing.

8. The coated abrasive article of claim 7 wherein the agglomerates are secured to said backing by make and size coats.

9. A bonded abrasive article comprising the agglomerates of claim 4.

10. Method of preparing an erodable agglomerate suitable for an abrasive product wherein said agglomerate comprises a multiplicity of individual grains of abrasive mineral, matrix material selected from the group consisting of pulp suitable for making paper and derivatives threeof, wood flour, vermiculite, and mixtures thereof, and a binder, said method comprising the steps of:

(a) dispersing said matrix material in a liquid medium;
(b) combining the dispersion resulting from step (a) with abrasive mineral and binder to form a mixture,
(c) curing the mixture from step (b),
(d) treating the cured mixture from step (c) to form agglomerates.

11. The method of claim 10 wherein the dispersion of step (a) comprises sufficient liquid to allow abrasive mineral to be distributed uniformly among the mass of matrix material.

12. The method of claim 10 wherein the mixture of step (b) comprises from about 55 to about 94 percent by weight abrasive mineral, from about 5 to about 35 percent by weight binder, from about 1 to about 40 percent by weight dispersion of liquid and matrix material.

13. The method of claim 10 wherein the mixture of step (c) is cured by heat.

14. The method of claim 10 wherein the cured mixture is treated by crushing to form agglomerates of the desired size.

15. The abrasive article of claim 1 wherein the matrix material is selected from pulp suitable for use in making paper and derivatives thereof, wood flour, and mixtures thereof.

16. The agglomerate of claim 4 wherein the matrix material is selected from pulp suitable for use in making paper and derivatives thereof, wood flour, and mixtures thereof.

17. A coated abrasive article comprising the agglomerates of claim 16 secured to a backing.

18. The coated abrasive article of claim 17 wherein the agglomerates are secured to a backing by make and size coats.

19. A bonded abrasive article comprising the agglomerates of claim 16.

* * * * *

UNITED STATES PATENT AND TRADEMARK OFFICE
CERTIFICATE OF CORRECTION

PATENT NO. : 4,652,275

DATED : March 24, 1987

INVENTOR(S) : Ulrich Bloecher and Ernest J. Duwell

It is certified that error appears in the above-identified patent and that said Letters Patent is hereby corrected as shown below:

Col. 1, line 65, "mineral, resinous binder," should read
--mineral, a binder, preferably a resinous binder--.

Col. 2, line 41, "and resinous binder" should read
--and a binder, preferably a resinous binder--.

Col. 9, line 36, "agglomerates, should read
--agglomerates--.

Col. 10, line 19, "threof" should read -- thereof --.

Signed and Sealed this

First Day of September, 1987

Attest:

DONALD J. QUIGG

Attesting Officer

Commissioner of Patents and Trademarks